(12) United States Patent
Tomlinson et al.

(10) Patent No.: US 9,181,037 B1
(45) Date of Patent: Nov. 10, 2015

(54) CONVEYOR ASSEMBLY

(71) Applicants: Roydan T. Tomlinson, College Place, WA (US); Dean Dunham, Walla Walla, WA (US); Christopher Woiler, College Place, WA (US)

(72) Inventors: Roydan T. Tomlinson, College Place, WA (US); Dean Dunham, Walla Walla, WA (US); Christopher Woiler, College Place, WA (US)

(73) Assignee: KEY TECHNOLOGY, INC., Walla Walla, WA (US)

( * ) Notice: Subject to any disclaimer, the term of this patent is extended or adjusted under 35 U.S.C. 154(b) by 0 days.

(21) Appl. No.: 14/460,210

(22) Filed: Aug. 14, 2014

(51) Int. Cl.
*B65G 27/24* (2006.01)
*B65G 27/04* (2006.01)
*B65G 27/32* (2006.01)

(52) U.S. Cl.
CPC ............... *B65G 27/24* (2013.01); *B65G 27/04* (2013.01); *B65G 27/32* (2013.01)

(58) Field of Classification Search
CPC ......... B65G 27/32; B65G 27/24; B65G 27/16
USPC .................................. 198/758, 759, 766, 769
See application file for complete search history.

(56) References Cited

U.S. PATENT DOCUMENTS

| | | | |
|---|---|---|---|
| 3,581,871 A * | 6/1971 | Forman ................. | B65G 27/00 198/751 |
| 4,378,064 A | 3/1983 | Brown | |
| 4,961,491 A | 10/1990 | Falconer | |
| 5,054,606 A * | 10/1991 | Musschoot ............ | B65G 27/32 198/751 |
| 6,079,550 A | 6/2000 | Gilman | |
| 6,179,117 B1 | 1/2001 | Gilman | |
| 6,189,683 B1 * | 2/2001 | Svejkovsky ............ | B65G 27/08 198/750.7 |
| 6,253,908 B1 | 7/2001 | Gilman | |
| 6,994,297 B1 * | 2/2006 | Hassan .................... | B64C 9/38 244/204 |
| 2001/0019008 A1 | 9/2001 | Gilman | |
| 2002/0088693 A1 * | 7/2002 | Takasan ................. | B65G 54/00 198/752.1 |
| 2003/0034228 A1 * | 2/2003 | Takasan ................. | B65G 27/00 198/752.1 |

* cited by examiner

*Primary Examiner* — James R Bidwell
(74) *Attorney, Agent, or Firm* — Randall Danskin P.S.

(57) ABSTRACT

A conveyor assembly is described and which includes a reciprocally moveable conveyor bed, having a product conveying surface, and a reactive mass electrical transducer, which is oriented in spaced relation relative to the conveyor bed and which, when energized, imparts reciprocal motion to the conveyor bed to move the product along the product conveying surface of the conveyor bed.

26 Claims, 11 Drawing Sheets

CONVEYOR ASSEMBLY

TECHNICAL FIELD

The present invention relates to a conveyor assembly for transporting a stream of products, and more specifically to a conveyor assembly which employs a reactive mass electrical transducer, and which imparts a desirable reciprocal motion to a conveyor bed so as to transport a product therealong.

BACKGROUND OF THE INVENTION

The uses of vibratory conveyors, of various designs are well known. These devices have been employed in assorted industry segments for decades. One particular form of vibratory conveyor, that being, the excited frame vibratory conveyor, has found widespread usage in food processing and other industries. Excited frame conveyor construction, and their operation are well known. In most forms of the invention, a base frame which rests on or which is suspended from an underlying supporting surface mounts one, or more, out-of-balance electric motors, which rotate an eccentric weight in order to impart a vibratory force, which is directed along the given line of reference through the center of mass of the adjacent vibratory conveyor bed, this vibratory force causes the vibratory bed to reciprocate in a given direction by means of a multiplicity of leaf springs, which moveably support the conveyor bed on the base frame.

The aforementioned excited frame vibratory conveyors are extremely reliable and are convenient to use. Notwithstanding the high reliability of such excited frame conveyors, shortcomings in the operation of such devices have been the attention of designers, and the users of such devices, for many years. For example, designers of such excited frame conveyors have known, for some period of time, that as the conveyor bed length increases, certain resonant vibratory frequencies are generated as the conveyor bed begins to reciprocate following the energizing of these aforementioned, out-of-balance motors. These resonant vibratory frequencies, under certain conditions, can cause undesirable motion in the conveyor bed. These resonant frequencies become an increasing problem as the conveyor bed becomes longer. To avoid these resonance modes employing the aforementioned out-of-balance motors have entailed utilizing various schemes and methodology to energize out-of-balance motors in a predetermined manner so as to prevent these resonance modes from causing adverse side-to-side or twisting motions of the conveyor bed, about its longitudinal axis. These schemes have included so-called "ramp up" or "ramp down" energizing of the respective out-of-balance motors so as to minimize the resonance modes that are generated. Still further, the generation of these resonance modes, which causes adverse movement of the conveyor bed, especially at longer lengths, has caused another problem to arise, that being, the premature wear, or breakage of the leaf springs which support the conveyor bed on the base frame.

In addition to the foregoing, the use of out-of-balance motors employing eccentric weights has long known problems which are associated with the premature wear of bearings, which support the rotating shafts of the electric motors bearing the eccentric weights. As should be understood, and from time-to-time such out-of-balance motors need to be replaced due to excessive bearing wear. In addition to the foregoing, and when installed, the previously mentioned excited bed conveyors when installed, and rendered operable, utilize given eccentric weights, which provides a predetermined frequency of vibration for the accompanying conveyor bed. As should be understood, and depending upon the weight of the product being transported by the conveyor bed, adjustment of this vibratory force, which is imparted to the conveyor bed, is difficult to change, absent a replacement of the eccentric weights, which are rotated by the out-of-balance motor. Changing these weights takes some period of time to accomplish. Therefore, there is currently no convenient means to make both a frequency and amplitude change of the amount of force that an out-of-balance motor provides to a conveyor bed, absent significant revisions to the drive arrangement of such prior art excited frame conveyors. Further, for extremely long conveyors, and which may have multiple motors at given locations along the length of the conveyor bed, such conveyors employ a rather complex system to control these motors. Finally, the use of out-of-balance motors limits the designer to the use of a system, which employs merely a vibratory force, which is most accurately depicted as a sine-wave, and does not allow a designer to employ vibratory force, which may best be understood as being a complex wave form. Such a complex vibratory wave form may be useful for moving specific particulate matter along a given conveyor bed.

The present invention, as described hereinafter, avoids the detriments associated with the prior art practices utilized heretofore, and provides a new conveyor assembly for moving particulate product along a conveyor bed, in a particularly noteworthy manner.

SUMMARY OF THE INVENTION

A first aspect of the present invention relates to a conveyor assembly which includes a reciprocally moveable conveyor bed having a product conveying surface; and a reactive mass electrical transducer which is oriented in spaced relation relative to the conveyor bed, and which, when energized, imparts reciprocal motion to the conveyor bed so as to move a product along the product conveying surface of the conveyor bed.

Still another aspect of the present invention relates to a conveyor assembly which includes an elongated moveable conveyor bed having a product conveying surface, and which further has a center of mass, and a given weight; a base member positioned on, and adjacent to a supporting surface, and wherein the base member supports the reciprocally moveable conveyor bed in a predetermined, spaced relationship relative to supporting surface, and wherein the base member has a given weight; a plurality of elongated springs which resiliently couple the elongated moveable conveyor bed to the base member, and further locates the elongated moveable conveyor bed in spaced relation relative to the base member; a reactive mass electrical transducer which, when electrically energized, generates a periodic, reciprocal physical force that imparts reciprocal motion to the elongated moveable conveyor bed so as to effect a movement of a product along the product conveying surface; a controller electrically coupled to the reactive mass electrical transducer, and which generates a predetermined digital waveform; and a signal generator electrically coupled with each of the controller, and the reactive mass electrical transducer, and wherein the signal generator receives the predetermined digital waveform and converts the predetermined digital waveform into an electrical signal which energizes the reactive mass electrical transducer so as to produce the periodic physical force which is imparted to the elongated moveable conveyor bed.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent laws "to promote the progress of science in useful arts" [Article I, Section 8].

Figure 1:
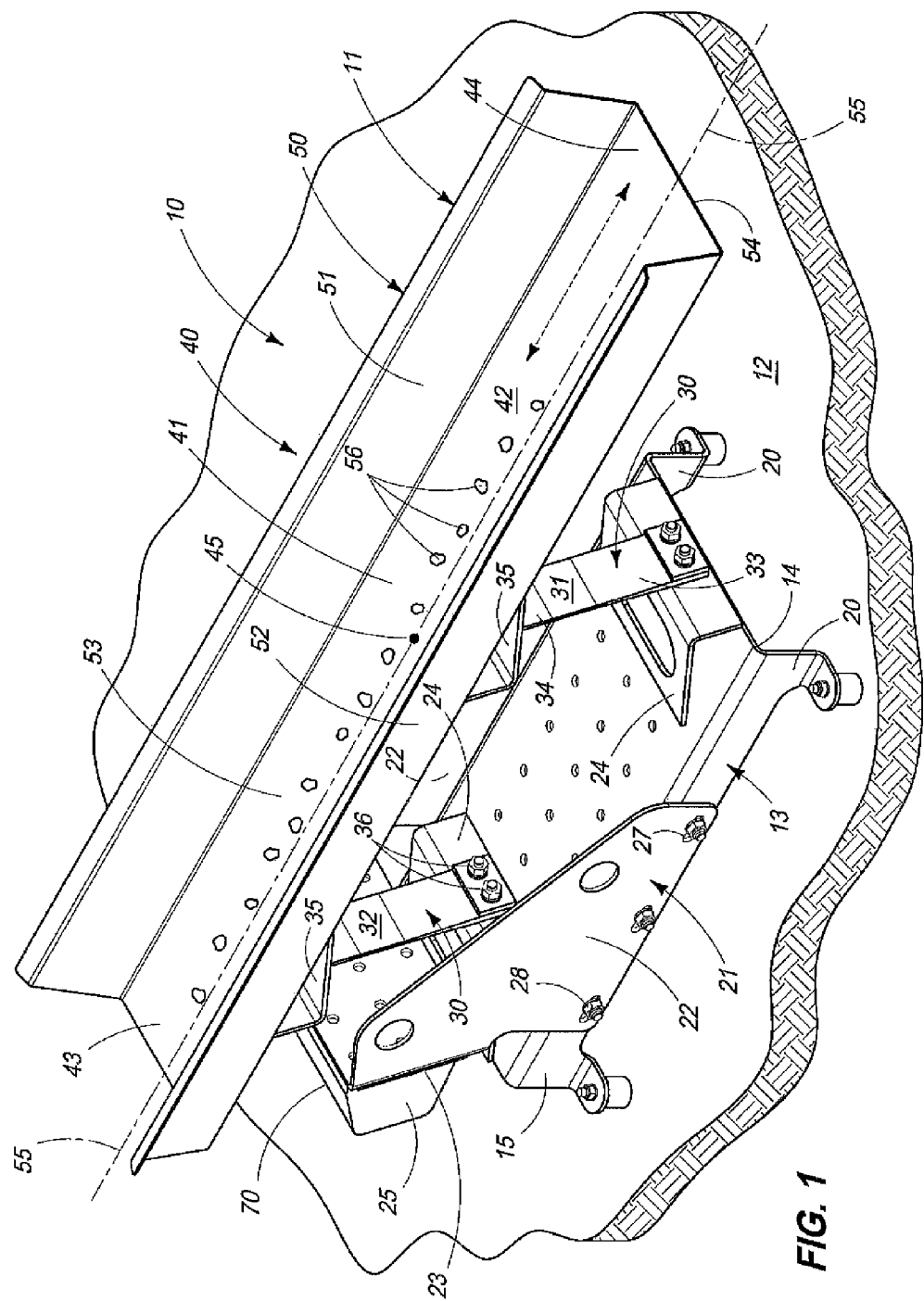
FIG. 1 is a perspective, side elevation view of one form of the conveyor apparatus of the present invention.
Figure 4:
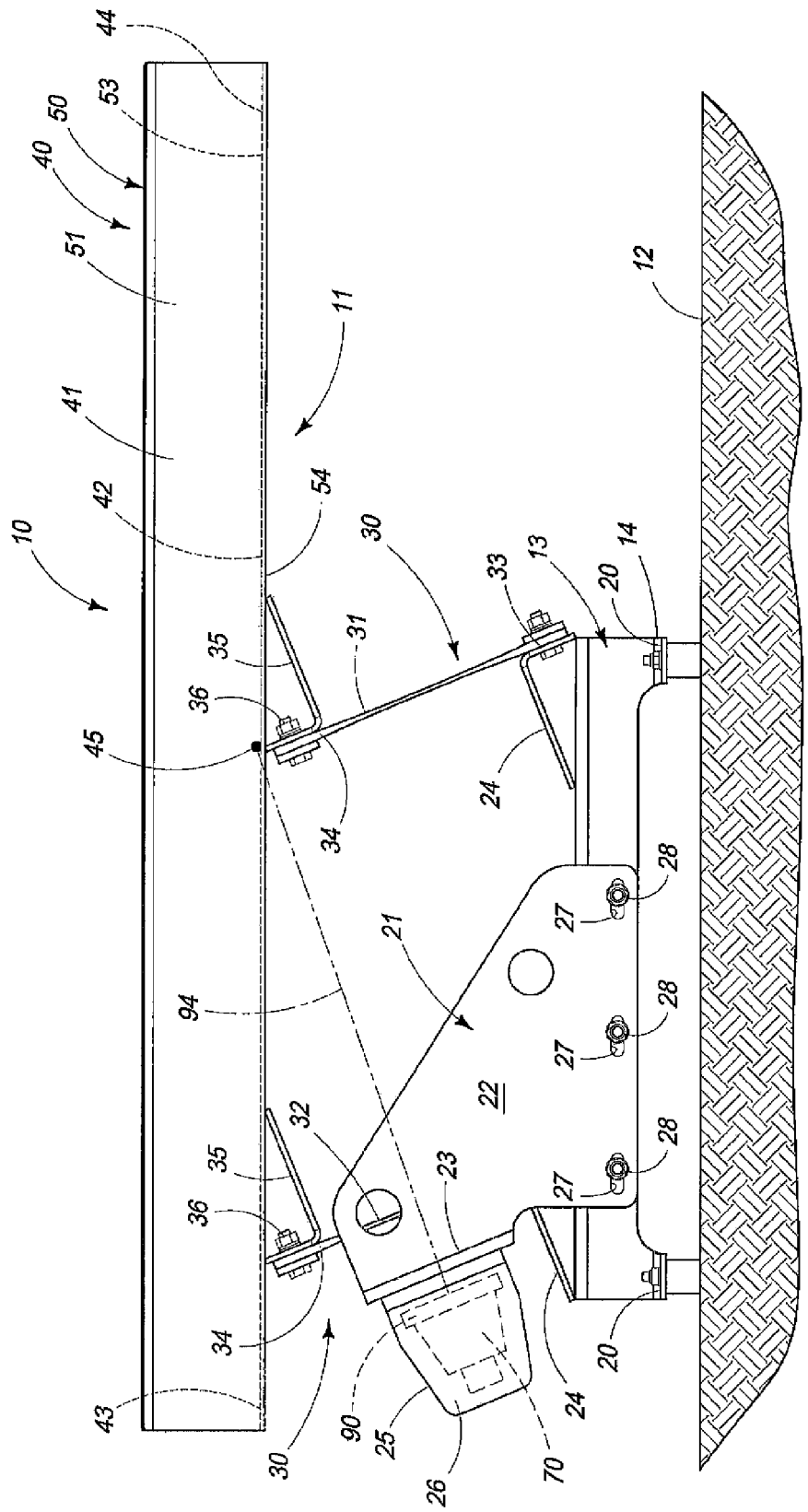
FIG. 4 is a side elevation view of the conveyor assembly, as seen in FIG. 1.
Figure 5:
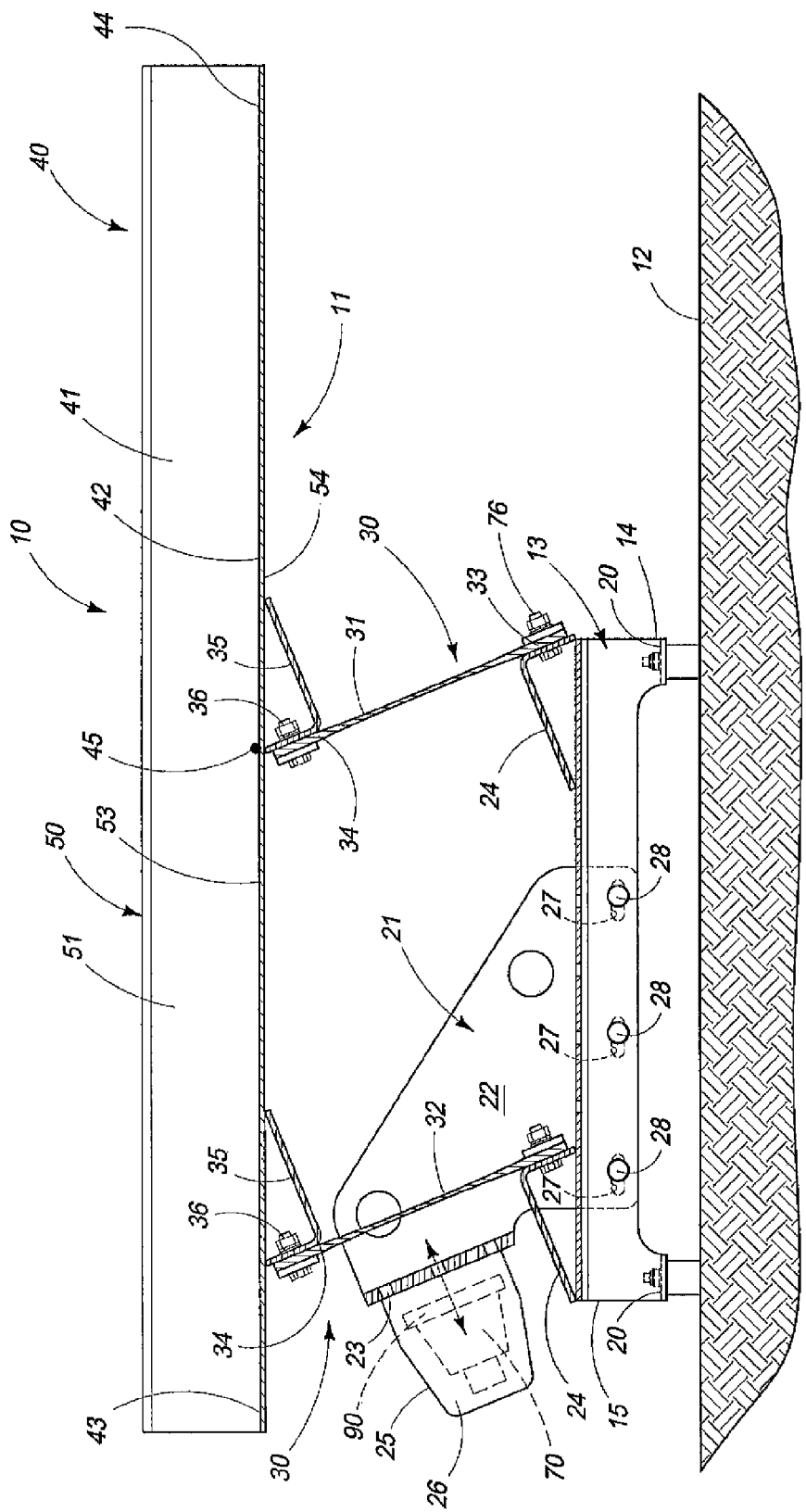
FIG. 5 is a transverse, longitudinal vertical sectional view of the conveyor assembly, as seen in FIG. 1.

The conveyor assembly of the present invention is generally indicated by the numeral 10 in FIG. 1 and following. The first form of the present apparatus is indicated by the numeral 11 in FIG. 1. The conveyor apparatus 10, as depicted in FIG. 1, rests in spaced relation relative to a supporting surface, here illustrated, as an underlying floor 12. However, it should be understood that the conveyor apparatus 10, as depicted herein, may be suspended from an overhead supporting surface, such as a ceiling, mezzanine, or the like, in certain, industrial applications or environments. The conveyor apparatus 10 includes a base member or frame, which is generally indicated by the numeral 13, and which further has a first end 14, and an opposite, second end 15. The base member or frame has a given mass, and weight, as will be discussed in further detail hereinafter. The base member or frame 13 further includes supporting feet 20, which locate the base frame in spaced relation relative to the underlying supporting surface 12. The supporting feet 20 may include resilient members to dampen vibrational forces, which may be experienced by the base frame, and prevent these vibrational forces from being transmitted to the underlying supporting surface 12. Mounted adjacent to the second end 15, of the base member 13, is a transducer mounting or positioning frame 21. The positioning frame includes a pair of side plates 22, which are located on the opposite sides of the base member 13, and which extend upwardly therefrom. The transducer positioning frame 21 includes a transversely oriented backplate 23, and which is made integral with, or fastened to, the respective pair of side plates 22. As best seen by reference to FIG. 4, the back plate 23 is located in a predetermined, angular relationship relative to the bottom surface of an adjacent, reciprocally moveable conveyor bed, and which will be discussed in greater detail, hereinafter. Additionally, and as will be seen in FIG. 1, a pair of resilient spring mounts 24 are individually affixed, as by welding or the like, to the base member or frame 13. The respective resilient spring mounts 24 are oriented and located in a given angular and spaced relationship one relative to the other, so as to position an attached resilient spring in a given angular orientation relative to an overhead conveyor bed. Both of these structures will be discussed in greater detail, below. As further seen in FIG. 4, a transducer housing or enclosure 25 is mounted on the back plate 23, and which further provides a cavity 26, and within which a transducer, as will be described hereinafter, is installed. The housing is designed to prevent debris, which maybe caused, at least in part, by the use of the invention from being deposited in, and around, the transducer, as will be described hereinafter. As seen in FIG. 4, adjustment slots 27 are provided in the lowermost edge of the respective pair of side plates 22. The adjustment slots are operable to receive fasteners 28 therethrough, and which enables the transducer mounting frame 21 to be moved generally in a longitudinal direction along the base member 13, and between the first and second ends 14 and 15. This adjustment allows the transducer, as will be discussed hereinafter, to be moveably adjusted so as to be oriented appropriately relative to an adjacent conveyor bed, which will be employed with the conveyor apparatus 10, and which will be discussed in greater detail, below. As seen in FIG. 1 and following, the conveyor apparatus 10 of the prevent invention includes, in the first form of the invention 11, a pair of elongated, and resilient leaf springs 30 of conventional design. The pair of elongated, and resilient leaf springs 30 include a first spring 31 which is mounted on the first end 14 of the base member or frame 13; and a second spring 32. In this regard, the first and second springs 31 and 32 are oriented substantially along, and in spaced relation, relative to the longitudinal axis of the conveyor bed, as will be discussed in greater detail, hereinafter. Each of the respective resilient springs 30, include a first end 33, which is mounted on each of the respective resilient spring mounts 24. As earlier noted, the spring mounts 24 are fastened to the base member 13. Further, the respective springs have an opposite, second end 35, which is remote thereto, and which is further located in spaced relation relative to the base member or frame 13. As illustrated in FIG. 4, a pair of conveyor bed spring mounts or fixtures 35 are mounted to a conveyor bed, as will be described below. The respective first and second springs 31 and 32 are attached to the respective pair of conveyor bed spring mounts or fixtures 35, and the underlying resilient spring mounts 24, by using conventional fasteners 36.

With reference to FIG. 1 and following, the conveyor apparatus 10 includes a reciprocally moveable conveyor bed 40, and which is supported in predetermined spaced relation relative to the supporting surface 12, and the base frame 13, by the individual, elongated, and resilient leaf springs 30, which were discussed, above. The reciprocally moveable conveyor bed is of substantially traditional design, and has a predetermined weight. The reciprocally moveable conveyor bed 40 has a main body 41, which is shown herein as being narrowly rectangular. The main body 41 further has a product conveying surface 42, which is substantially horizontally oriented. However, some forms of the invention may include a product conveying surface which is angled, upwardly, so as to move a product in a vertical direction. The product conveying surface has a first intake end 43, and a second, exhaust end 44. The main body 41 further has a center of mass, which is generally indicated by the numeral 45. The main body further includes generally vertically extending sidewalls 50, and which are positioned on opposite sides of the product conveying surface 42, and which are further operable to confine a product, as noted below on the product conveying surface 42, and for transport or movement between the first and second ends 43 and 44, respectively. The product conveying surface 42 has an upwardly facing top surface 53, and an opposite, downwardly facing, bottom surface 54. The pair of conveyor bed spring mounts 35 are each fastened to the bottom surface 54, as by welding and the like. The main body 41 further has a longitudinal axis 55, as seen in FIG. 1, and following. Again, the product conveying surface 42 supports the movement of a product 56 between the first and second ends 43 and 44, respectively.

The present invention 10 includes a novel, reactive mass electrical transducer, and which is generally indicated by the numeral 70 and which, in the first form 11, is mounted on the base frame 13. The reactive mass electrical transducer has a first form 71 (FIG. 7), and a second form 72, as best seen by reference to FIG. 6. In the first form 71, which is best seen in FIG. 7, the reactive mass electrical transducer has a rigid supporting frame 73, which is substantially circular and somewhat frusto-conically shaped. The support frame 73 supports a fixed, annular shaped magnet 74 of traditional design. Still further, the reactive mass electrical transducer has a moveable electrical coil 75, and the distal end of the moveable electrical coil 75 is affixed to a pair of flexible membranes, which are generally indicated by the numeral 76. The pair of flexible membranes 76 are employed to keep the moveable, electrical coil 75 substantially concentrically oriented relative to the fixed annular magnet 74. A rigid support member 80 is affixed to each of the flexible membrane 76, and a reactive mass 90, having a given weight, is mounted on the support member 80. The reactive mass has a main body 91, which has a fastener aperture or other passageway 92 formed therein. This permits the reactive mass 90 to be releasably affixed to the underlying support member 80. The reactive mass electrical transducer 70, when energized, is moveable along the reciprocal path of travel which is generally indicated by the numeral 93 (FIG. 7). When energized, the reactive mass electrical transducer 70 reciprocates the reactive mass 90 and so generates a predetermined, physical force, which is directed along a line of reference 94 (FIGS. 2 and 4), and which is directed through the center of mass 45 of the reciprocally moveable conveyor bed 40. Upon energizing the reactive mass electrical transducer 70, the reactive mass electrical transducer 70 effects or otherwise imparts reciprocal motion of the conveyor bed, so as to cause movement of the product 56 between the first and second ends 43 and 44 thereof. As seen in the drawings (FIG. 7), a pair of electrical connections or conduits 95 are made integral with the reactive mass electrical transducer 70, and which deliver electrical energy to the moveable electrical coil 75, as will be addressed, below.

Figure 6:
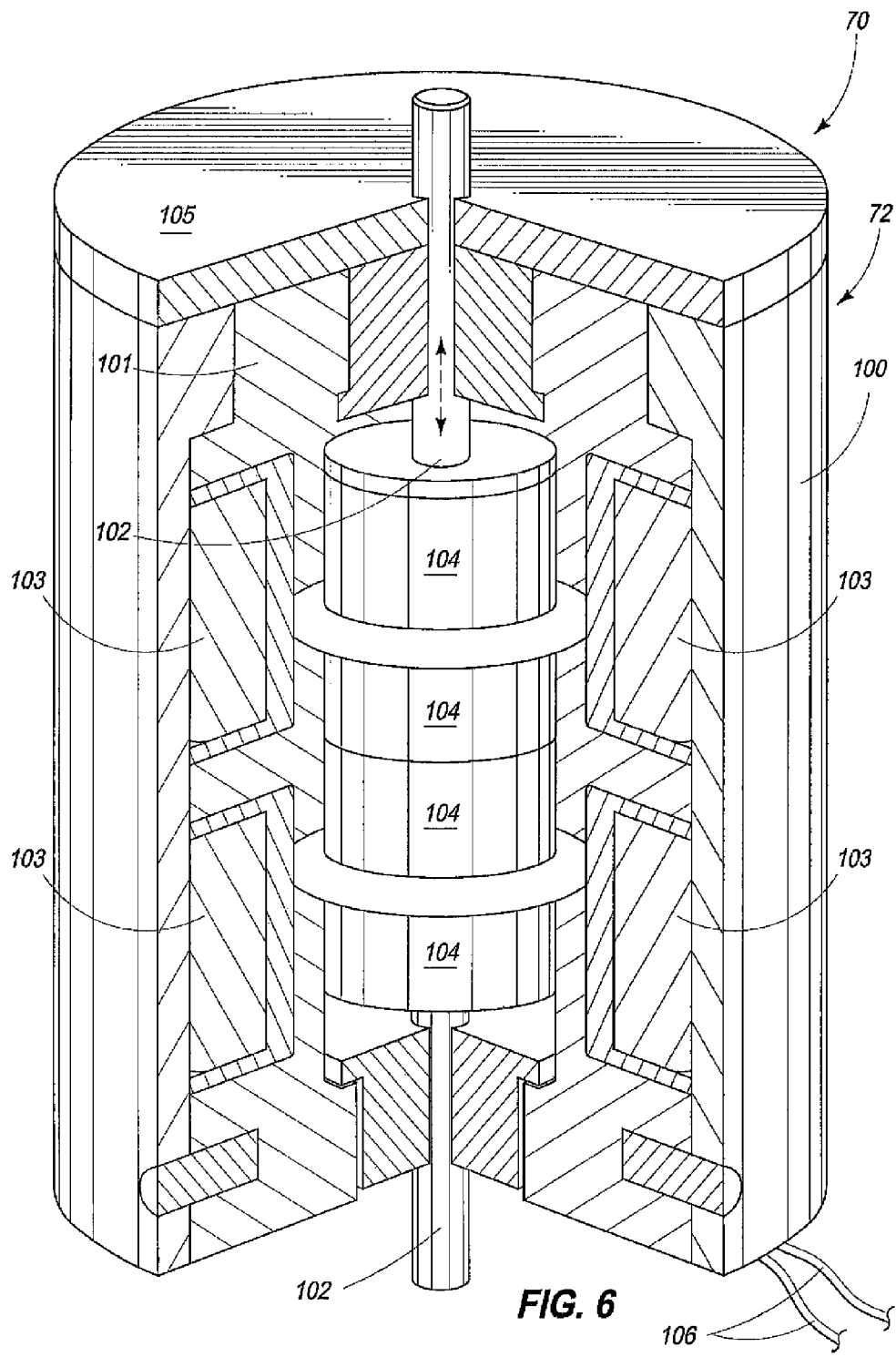
FIG. 6 is a transverse, vertical, sectional view of one form of a reactive mass electrical transducer which finds usefulness in the present invention.
Figure 7:
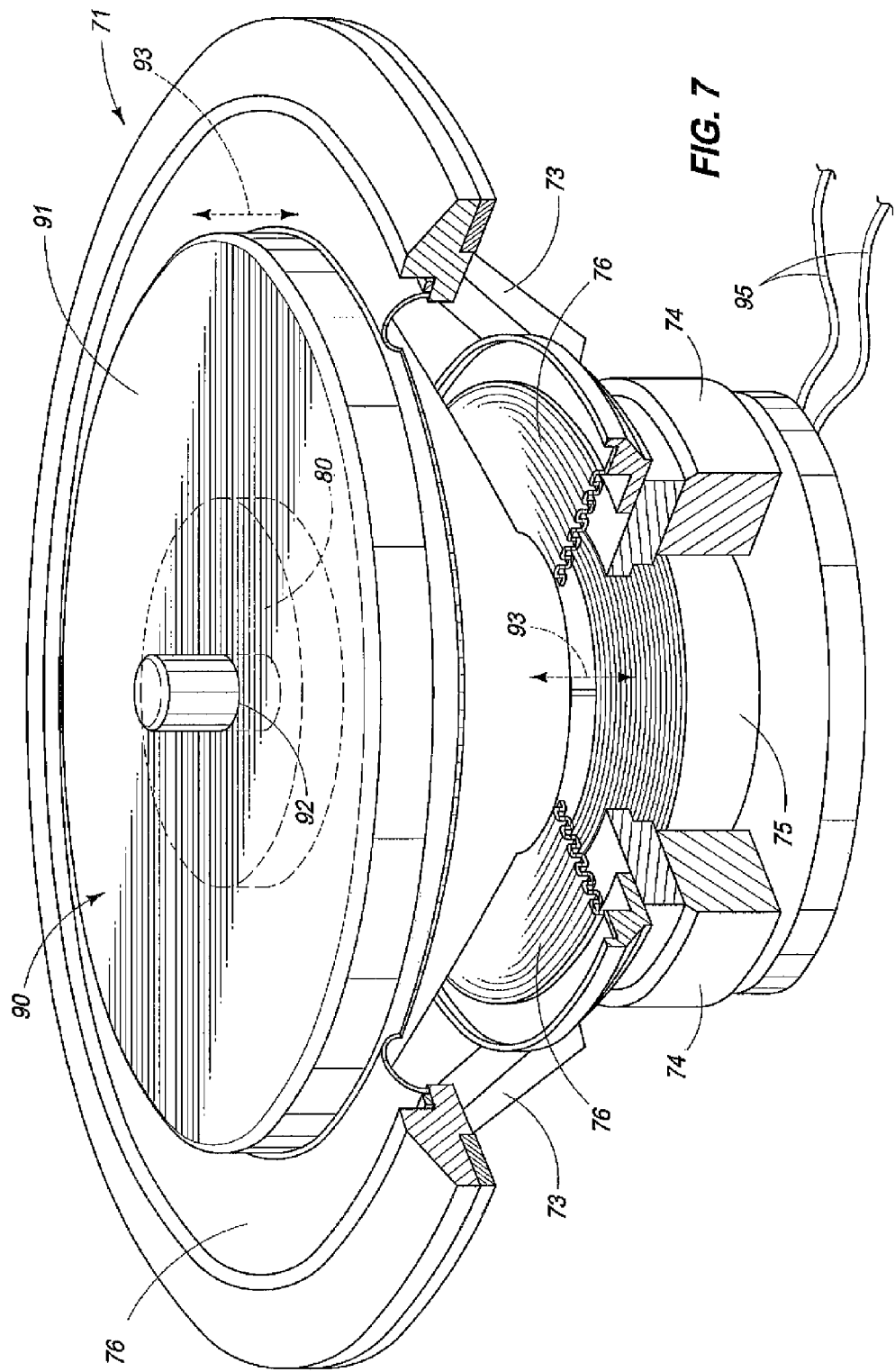
FIG. 7 is a perspective, partial, transverse vertical sectional view of one form of a reactive mass electrical transducer, and which finds usefulness in the present invention.

The second form 72 of the reactive mass electrical transducer 70 is shown in FIG. 6, and generally constitutes a moveable magnet design or arrangement as compared to the fixed magnet arrangement as seen in FIG. 7. In this particular form of the invention, the reactive mass electrical transducer has a main body 100, which defines an internal cavity 101. Mounted within the internal cavity 101 is a moveable actuator shaft 102, which is reciprocally moveable along its longitudinal axis. Mounted within the internal cavity 101 is a pair of fixed electrical coils 103, and which, again, are electrically coupled to a source of an electrical signal, as will be described below. These coils are only generally depicted so as to aide in the understanding of the invention. Still further, and mounted along the moveable actuator shaft 102, are moveable ring magnets 104, and which move in unison with the moveable actuator shaft 102. Again, a support member 105 is provided, and which is connected endwardly of the moveable actuator shaft 102. As seen in FIG. 6, electrical conduits 106 supply electrical power to the second form 72 of the reactive mass electrical transducer.

It should be understood that the reactive mass 90, as previously described, would be mounted on, and move reciprocally with, the activator shaft 102.

Figure 2:
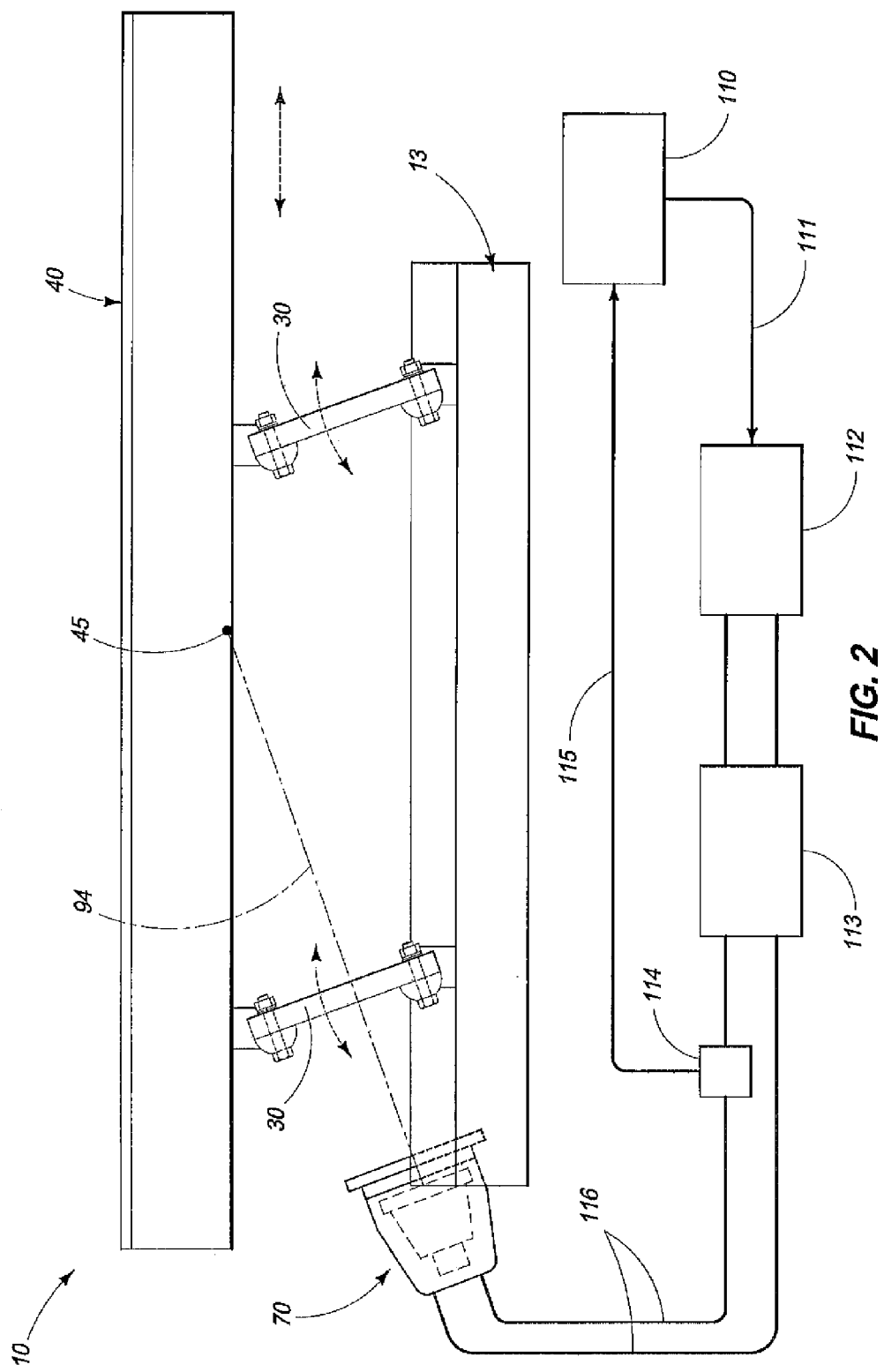
FIG. 2 is a greatly simplified, schematic view of a control arrangement useful in the operation of the present invention.
Figure 3:
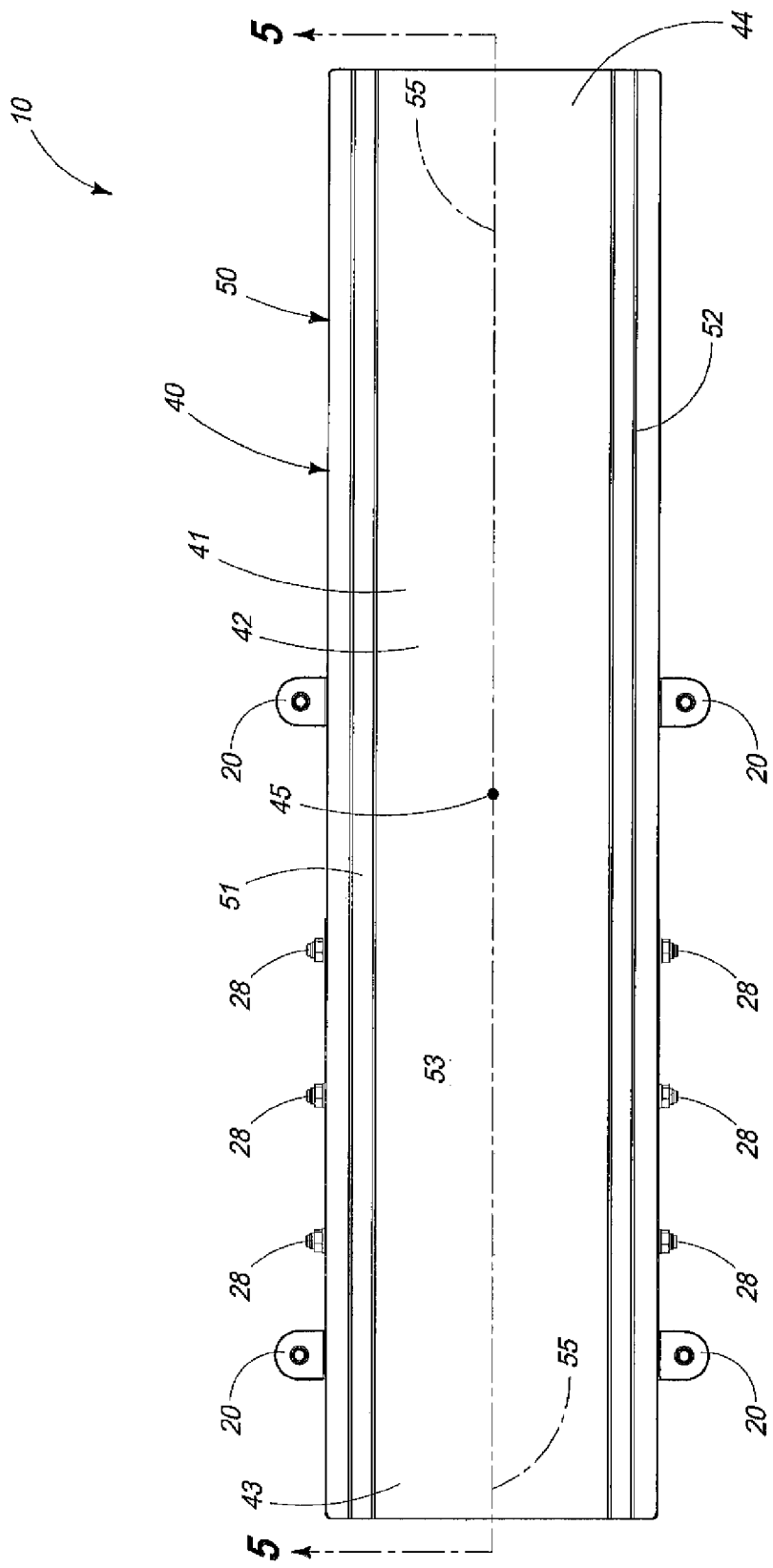
FIG. 3 is a top, plan view of the conveyor assembly, as seen in FIG. 1.

Referring now to FIG. 2, a greatly simplified arrangement for rendering the present invention 10 operational, is shown. In this arrangement, it will be seen that a controller, here generally indicated by the numeral 110, and which can, in one form of the invention, constitute a regular, general purpose computer, is coupled in controlling relation relative to the apparatus 10. The computer or other controller 110 generates a digital wave 111, and which is received by a signal generator 112. The signal generator 112 is well known. The signal generator takes the digital wave form 111, and which is generated by the controller 110, and then generates an appropriate electrical signal or output, and which is then provided to a downstream power amplifier 113. The power amplifier 113 then takes the electrical output generated by the signal generator, and then generates an amplified electrical output, which is subsequently delivered to the reactive mass electrical transducer 70, so as to energize same, and produce reciprocal movement 93 in the reactive mass 90, and which is further made integral therewith. This electrical output is delivered by the electrical conduits 116. As seen in FIG. 2, an amperage measuring device 114 is provided downstream of the power amplifier and provides a feedback signal 115 to the controller 110, so as to provide monitoring of the operation of the reactive mass electrical transducer 70. An operator, not shown, therefore may use the controller 110 to change both the frequency and the amplitude of the electrical output provided by the power amplifier 113 to the reactive mass electrical transducer 70, so as to effect the resulting vibratory motion imparted to the reciprocally moveable conveyor bed 40. This allows the current apparatus 10 to be immediately, dynamically adjusted, based upon the operational conditions being experienced by the reciprocally moveable conveyor bed 40. Further, this arrangement allows for the simultaneous energizing of the reactive mass electrical transducer 70, in a given manner so as to avoid the prior art problems which are associated with ramping up, or ramping down of an out-of-balance motor through given resonance modes, which may be possessed by the reciprocally moveable conveyor bed 40. This arrangement also avoids many of the problems associated with the bending and twisting of a conveyor bed 40, as previously experienced, and when using the prior art out-of-balance motors heretofore. Still further, and because of this arrangement, the earlier "tuning" which was utilized, heretofore, with regard to out-of-balance motors has been substantially eliminated. As a result, the controller 110 may be utilized to precisely fine-tune or adjust the operation of the apparatus 10, thus eliminating the need for high degrees of precision when assembling the apparatus 10, as was previously the case with prior art excited frame conveyors which have been utilized in the past. Additionally, and in one possible form of the invention, other sensors may be deployed (not shown) on the reciprocally moveable conveyor bed 40, and which can provide feedback to the controller 110, in order to further fine tune or adjust the operation of the apparatus 10 in a manner which has been not possible heretofore.

Figure 8:
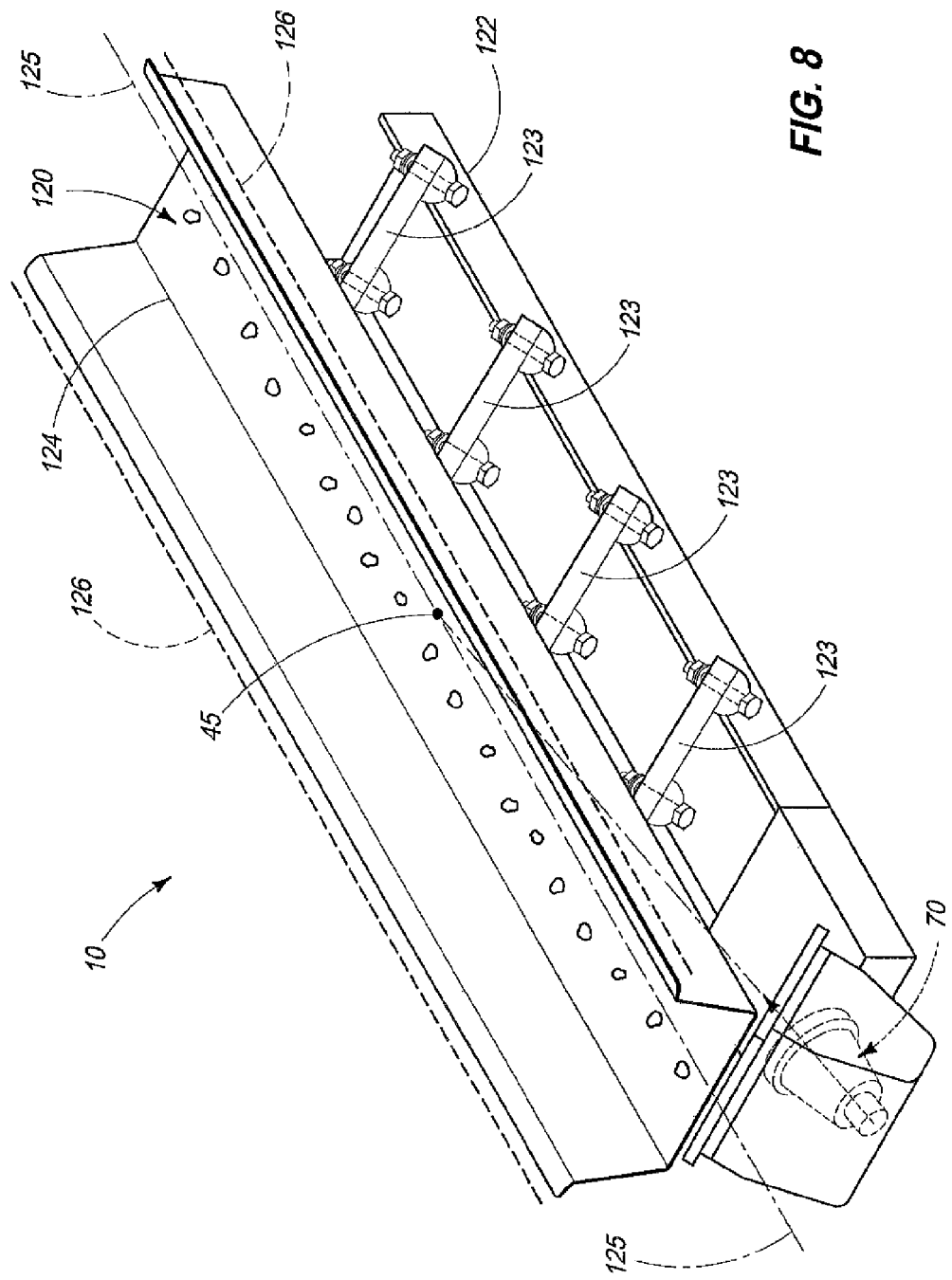
FIG. 8 is a perspective, greatly simplified view of a second form of the conveyor assembly of the present invention.

Referring now to FIG. 8, a second form of the invention 120 is illustrated. The second form of the invention is somewhat similar in operation to the first form 11, but further has some other noteworthy features. The second form 120 includes a base frame 122 that rests on an underlying surface (not shown), and which further has a multiplicity of elongated, and resilient springs 123 that extend upwardly therefrom so as to position a reciprocally moveable conveyor bed 124 in spaced relation relative thereto. As seen in FIG. 8, the reciprocally moveable conveyor bed has a longitudinal axis which is generally indicated by the numeral 125. Further, the reactive mass electrical transducer 70 is mounted on the base member, or frame 122, and is, again, angularly oriented so as to exert a physical force by reciprocating the reactive mass 90, along a line which passes through the center of mass 45 of the conveyor bed, as illustrated. As seen in FIG. 8, and in the second form of the invention, a multiplicity of elongated and resilient springs 123, are oriented along predetermined lines of reference 126, and which are oriented in parallel, spaced relation relative to the longitudinal axis 125 of the reciprocally moveable conveyor bed 124. Again, the selective energizing of the reactive mass electric transducer 70 is effective in causing a desired reciprocal motion of the reciprocally moveable conveyor bed 123, so as to cause product movement therealong same.

Figure 9:
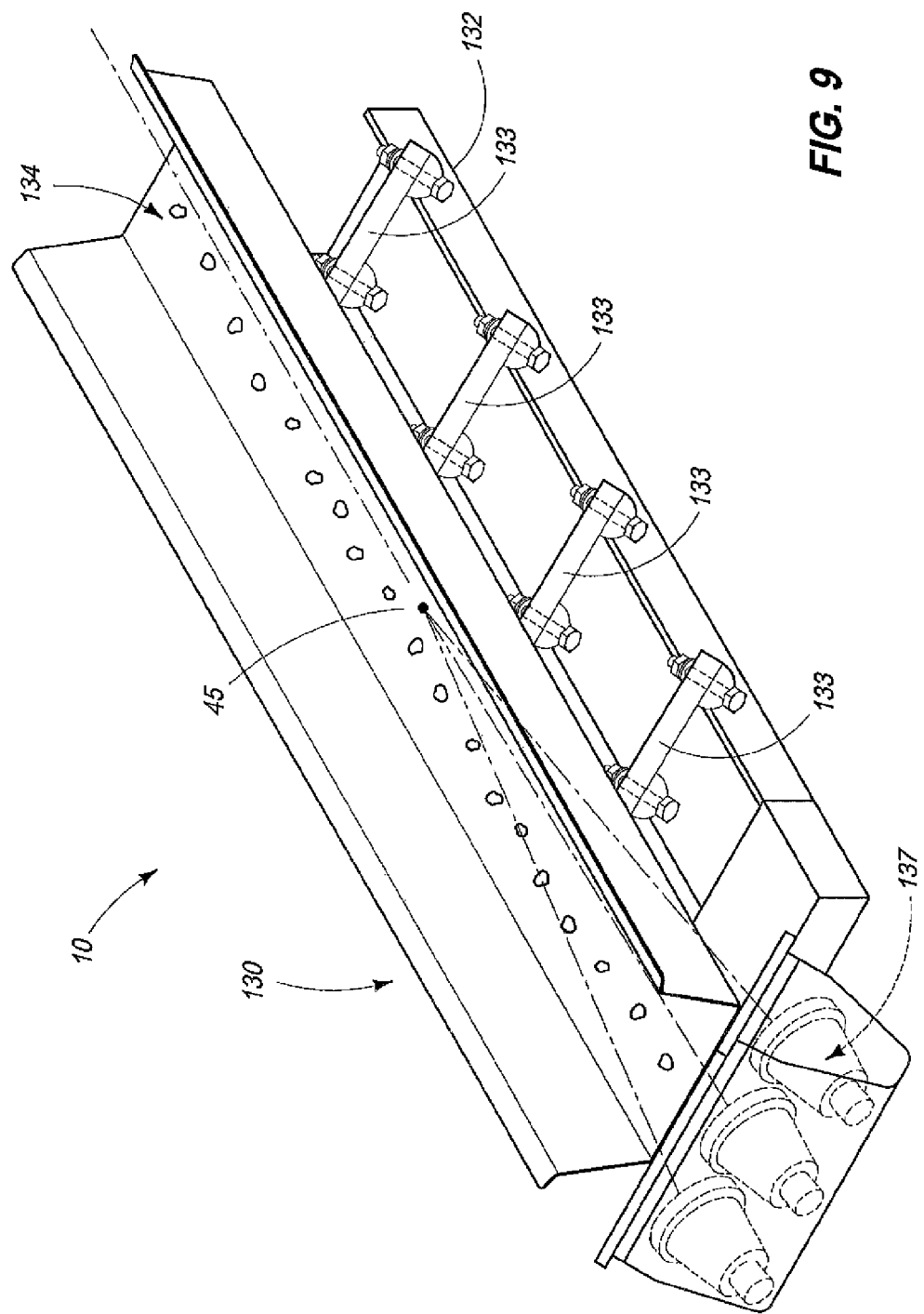
FIG. 9 is a perspective greatly simplified view of still another form of the present invention.

Referring now to FIG. 9, a third form of the invention is shown, and which is generally indicated by the numeral 130. In this regard, the third form of the invention includes a base member 132, and which is similar to that earlier disclosed. The base member has affixed thereto a multiplicity of elongated leaf springs, which are generally indicated by the numeral 133, and which further extend upwardly therefrom. In this regard, the multiplicity of leaf springs support a reciprocally moveable conveyor bed 130, in predetermined, spaced, moveable relation relative to the underlying base member or frame 132. The reciprocally moveable conveyor bed 134 is, again, defined by a longitudinal axis which is shown by the line labeled 135. As illustrated, and in the third form of the invention 130, a multiplicity of reactive mass electrical transducers 137 are mounted on the base frame or member 132, and are operable to deliver the physical force which is generated, again, through the center of mass of the overhead reciprocally moveable conveyor bed 133. In this form of the invention, the multiplicity of individual reactive mass electrical transducers 70 are provided or are arranged in a manner so as to give or provide a level of redundancy to the resulting apparatus 10. In this regard, if one of the multiplicity of reactive mass electrical transducers 137 fails, the third form of the invention 130 is not rendered inoperable to transport a product. In this situation, a repair person would subsequently remove the unresponsive reactive mass electrical transducers 137 and then place a functional transducer in its place without the need for shutting down the operation of the third form of the invention 130. This is particularly important in those situations where the apparatus has been employed in a large factory-like setting and where the failure of one of the apparatus in a production line, for example, could render the production line non-functional for hours, or perhaps even days, until a repair can be made.

Figure 10:
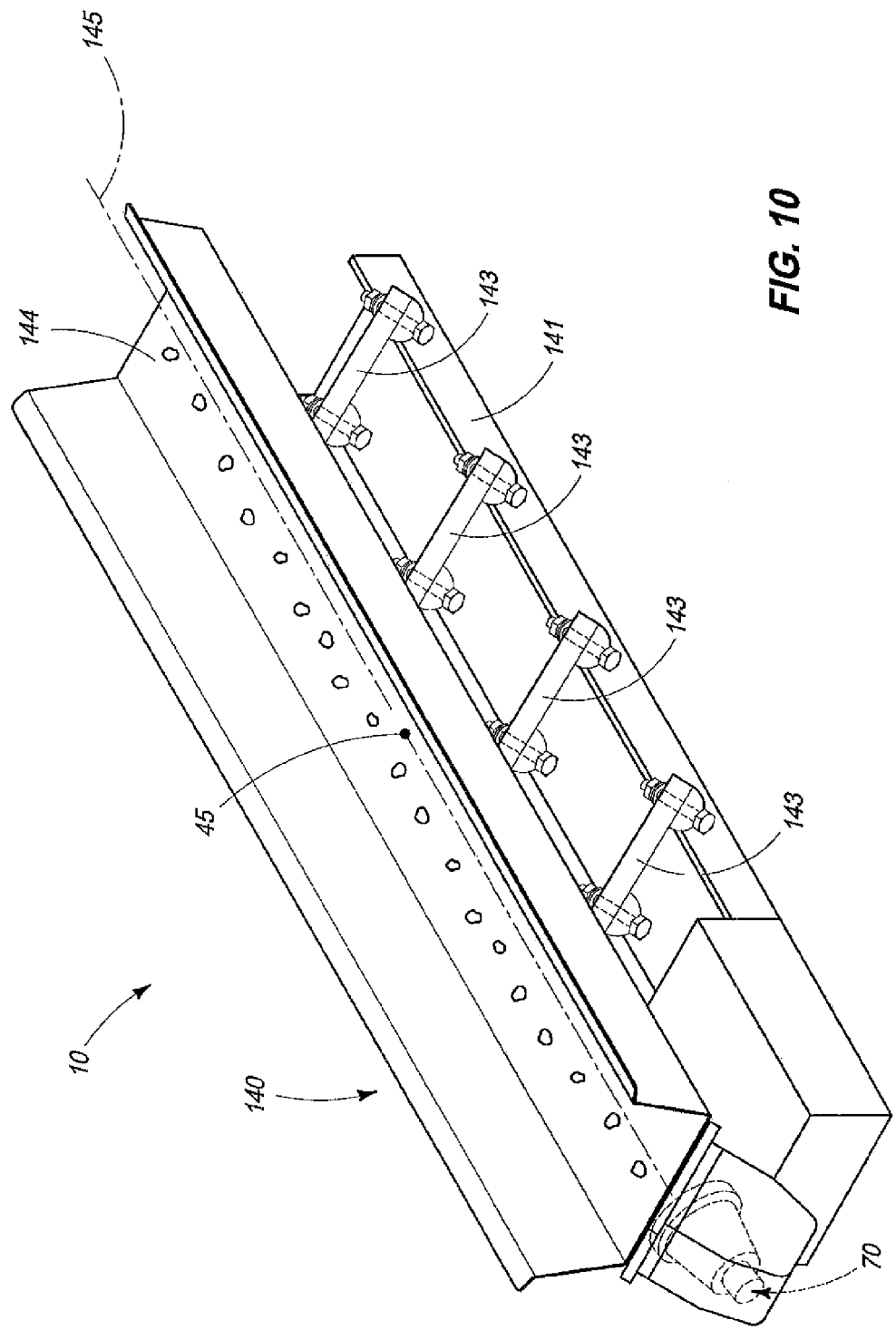
FIG. 10 is a perspective, partial, greatly simplified side elevation view of yet still another form of the present invention.

Referring now to FIG. 10, a fourth form of the invention 140 is shown in this greatly simplified illustration. As seen herein, the fourth form of the invention 140 includes a multiplicity of resilient springs 143, and which are mounted on a base frame 141, and which further support the reciprocally moveable conveyor bed 144, in spaced relation relative thereto. In this form of the invention, it should be understood that the reciprocally moveable conveyor bed 140 has a longitudinal axis which is generally indicated by the line labeled 145. Positioned endwardly of the reciprocally moveable conveyor bed 144, and oriented substantially coaxially along the longitudinal axis 145 thereof, is a reactive mass electrical transducer 70, as earlier described. Again, the selective energizing of the reactive mass electrical transducer 70 is effective in causing the conveyor bed 144 to reciprocate in a desirable manner so as to achieve the benefits of the present invention.

Figure 11:
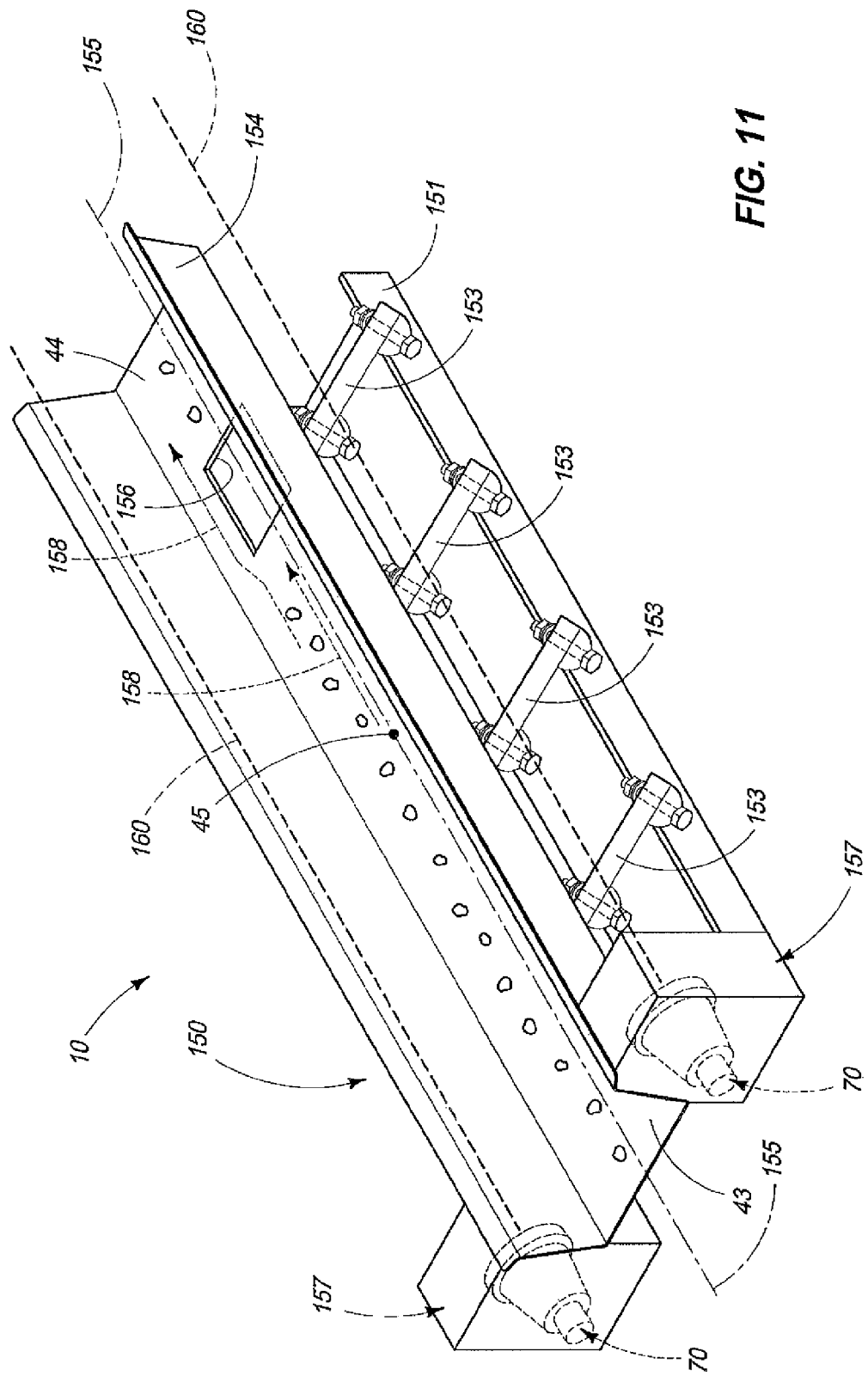
FIG. 11 is still another perspective, greatly simplified, side elevation view of yet another form of the present invention.

Referring now to FIG. 11, a fifth form of the invention is generally indicated by the numeral 150. As seen in this quite simplified view, a multiplicity of leaf springs 153 are supported on a base member 151, and which are also coupled to a reciprocally moveable conveyor bed 154. The illustrated, reciprocally moveable conveyor bed 154, operates in a manner very similar to the previously described conveyor beds, that is, it has a longitudinal axis 155, and supports a product for movement therealong between the intake and exhaust ends thereof. In this particular form of the invention, it will be seen that the reciprocally moveable conveyor bed 154 has a product diverting aperture 156 formed therein, and which is located in an offset position or orientation relative to the longitudinal axis 156. In this form of the invention, a pair of reactive mass electric transducers 70, are provided, and which are mounted laterally, outwardly relative to the longitudinal axis 155, and on one end of the reciprocally moveable conveyor bed 154. Again, the respective reactive mass, electrical transducers 70, when rendered operable, generate a physical force which is directed along a line of reference 160, and which is substantially parallel to the longitudinal axis 155, so as to impart, or cause, vibratory motion to the reciprocally moveable conveyor bed 154. In the fifth form of the invention, the product which is deposited can be rendered moveable along discreet, and different paths of travel 158, so as to divert at least a portion of the product being transported through the product diverting aperture 156, or further to completely avoid the aperture 156, and then continue on to the discharge end of the conveyor bed 154. This arrangement is made possible by the selective energizing of the respective individual reactive mass electrical transducers 70 in a fashion such that the amplitude of force provided by the reactive mass 90 is not the same on each side of the reciprocally moveable conveyor bed 154. When this happens, the reciprocally moveable conveyor bed 154 is operable to divert the product being transported, along the different paths of travel 158, so as to provide a convenient means whereby a user can selectively divert or otherwise "steer" product along different paths of travel during a manufacturing process.

OPERATION

The operation of the described embodiments of the present invention are believed to be readily apparent and are briefly summarized at this point.

In its broadest aspect, the prevent invention relates to a conveyor assembly 10, which includes a reciprocally moveable conveyor bed 40, having a product conveying surface 42; and a reactive mass electrical transducer 70, which is oriented in spaced relation relative to the conveyor bed 40 and which, when energized, imparts reciprocal motion to the conveyor bed 40 to move a product 56 along the product conveying surface 42, of the conveyor bed 40. The present invention includes a base member 13, which is positioned on an adjacent supporting surface 12, and which supports the reciprocally moveable conveyor bed 40 in spaced relation relative to the supporting surface 12. The conveyor assembly 10 further includes a plurality of resilient and elongated springs 30, which couple the reciprocally moveable conveyor bed 40 to the base member 13. The resilient and elongated springs 30 locate the reciprocally moveable conveyor bed 40 in spaced relation relative to the base member 13. In the arrangement as seen in FIG. 1 and following, the reciprocally moveable conveyor bed 40 has a longitudinal axis 55. The respective resilient elongated springs 30 are located in one form of the invention (FIG. 1) along the longitudinal axis 55 of the reciprocally moveable conveyor bed 40. In another form of the invention (FIG. 8), the reciprocally moveable conveyor bed 124 has a longitudinal axis 125. In this form of the invention, the respective resilient and elongated springs 123 are oriented along a predetermined line of reference 126, which is oriented in parallel, spaced relation relative to the longitudinal axis 125 of the reciprocally moveable conveyor bed 124. In the first form of the invention 11, as described in the application, the invention has a reactive mass electrical transducer 70, which is located in non-coaxial alignment relative to the longitudinal axis 55 of the reciprocally moveable conveyor bed 40. In another form of the invention (FIG. 11), the reciprocally moveable conveyor bed 154 has a longitudinal axis 155, and wherein a pair of reactive mass electrical transducers 157 are located in a parallel spaced relationship relative to the longitudinal axis 155 of the reciprocally moveable conveyor bed 154.

In several of the forms of the invention described in the specification, the reactive mass electrical transducer 70, which is employed is mounted on the base frame 13, and which further, when energized, reciprocates a reactive mass 90 in a manner so as to generate a predetermined force, which is directed along a given line of reference 94 (FIG. 4) and which passes through the reciprocally moveable conveyor bed. As seen in FIG. 1, a given line of reference 94 of the reactive mass electrical transducer 70 passes through the center of mass 45 of the reciprocally moveable conveyor bed 40. In all the forms of the invention as disclosed, a controller 110 is provided, and which is coupled to the reactive mass electrical transducer 70, and which controls the reciprocal movement of the reactive mass 90, so as to effect the subsequent movement of the product 56, along the conveying surface 42 of the reciprocally moveable conveyor bed 40. In one form of the invention, the reactive mass electrical transducer 70 has a fixed magnet 74 (FIG. 2), and a cylindrically shaped and moveable electrical coil 75. In this form of the invention, the reactive mass 90 is moveably mounted in spaced, substantially coaxial and concentric relation relative to cylindrically shaped electrical coil 75 by a pair of flex membranes 76. In another possible form of the invention, the reactive mass electrical transducer 72 has a moveable magnet 104 (FIG. 6), and fixed, cylindrically shaped electrical coils 103. The reactive mass 90 is concentrically mounted in spaced, coaxial relation relative to the cylindrically shaped electrical coils 103.

In one possible form of the invention (FIG. 9), a plurality of reactive mass transducers 137 are mounted on a base frame 132, and which are operable to impart reciprocal motion to a reciprocally moveable conveyor bed 134. In all forms of the invention as described, the reciprocally moveable conveyor bed 40 has a natural reciprocal frequency which affects an optimal movement of the product 56 along the conveying surface 42. In this regard, a weight of the reactive mass 90 is selected so as to impart the natural reciprocal frequency to the reciprocally moveable conveyor bed 40. In all forms of the invention, the reciprocally moveable conveyor bed 40 has a maximum reciprocal stroke and wherein the product 56 can move along the product conveying surface 42, in an infinitely variable speed from a speed of zero, to the maximum reciprocal stroke attributable to the reciprocally moveable conveyor bed which is employed.

It should be understood that each of the respective elongated moveable conveyor beds, as depicted and described, as well as the base member, have individual weights, and wherein the ratio of the weight of the elongated moveable conveyor bed 40 to the weight of the base 13 is about 1.8 to about 3. In the arrangement as seen in the drawings, the reactive mass, which is used by the reactive mass electrical transducer, typically has a weight of less than about 10 pounds. Still further, when the reactive mass electrical transducer 70 is energized, it reciprocates the reactive mass 90 at a frequency of about 12.5 Hz. to about 13.8 Hz.

Therefore, it will be seen that the present invention provides a convenient means for controlling the operation of a reciprocally moveable conveyor bed 40, in a manner not possible heretofore. The present invention is convenient, easy to operate, substantially avoids all the impediments and shortcomings of the prior art teachings utilized heretofore, and provides a means by which an operator can readily detect and then control the operation of the reciprocal conveyor bed in a manner to achieve with selective and efficient delivery of particulate matter, to downstream manufacturing processes.

In compliance with the statute, the invention has been described in language more or less specific as to structural and methodical features. It is to be understood, however, that the invention is not limited to the specific features shown and described, since the means herein disclosed comprise preferred forms of putting the invention in effect. The invention is, therefore, claimed in any of its forms or modifications within the proper scope of the appended claims appropriately interpreted according to the Doctrine of Equivalence.

We claim:

1. A conveyor assembly comprising:
   a reciprocally moveable conveyor bed having a product conveying surface;
   a base member positioned on an adjacent supporting surface, and which supports the reciprocally moveable conveyor bed in spaced relation relative to the supporting surface;
   a plurality of resilient and elongated springs which couple the reciprocally moveable conveyor bed to the base member, and wherein the resilient and elongated springs locate the reciprocally moveable conveyor bed in spaced relation relative to the base member; and
   a reactive mass electrical transducer which is oriented in spaced relation relative to the conveyor bed, and which, when energized, imparts reciprocal motion to the conveyor bed to move a product along the product conveying surface of the conveyor bed.

2. A conveyor assembly as claimed in claim 1, and wherein the reciprocally moveable conveyor bed has a longitudinal axis, and wherein the respective resilient, and elongated springs are located along the longitudinal axis of the reciprocally moveable conveyor bed.

3. A conveyor assembly as claimed in claim 1, and wherein the reciprocally moveable conveyor bed has a longitudinal axis, and wherein the respective, resilient, and elongated springs are oriented along a predetermined line of reference which is oriented in parallel, spaced relation relative to the longitudinal axis of the reciprocally moveable conveyor bed.

4. A conveyor assembly as claimed in claim 1, and wherein the reciprocally moveable conveyor bed has a longitudinal axis, and wherein the reactive mass electrical transducer is located in non-coaxial alignment relative to the longitudinal axis of the reciprocally moveable conveyor bed.

5. A conveyor assembly as claimed in claim 1, and wherein the reciprocally moveable conveyor bed has a longitudinal axis, and wherein the reactive mass electrical transducer is located in a parallel, spaced relationship relative to the longitudinal axis of the reciprocally moveable conveyor bed.

6. A conveyor assembly as claimed in claim 1, and wherein the reactive mass electrical transducer is mounted on the base member, and which further, when energized, reciprocates a reactive mass in a manner so as to generate a predetermined force which is directed along a given line of reference which passes through the reciprocally moveable conveyor bed.

7. A conveyor assembly as claimed in claim 6, and wherein the reciprocally movable conveyor bed has a center of mass, and wherein the given line of reference of the reactive mass electrical transducer passes through the center of mass of the reciprocally moveable conveyor bed.

8. A conveyor assembly as claimed in claim 7, and further comprising:
a controller coupled to the reactive mass electrical transducer, and which controls the reciprocal movement of the reactive mass so as to effect the subsequent movement of the product along the conveying surface of the reciprocally moveable conveyor bed.

9. A conveyor assembly as claimed in 8, and wherein the reactive mass electrical transducer has a fixed magnet, and a cylindrically shaped, moveable electrical coil, and wherein the reactive mass is moveably mounted in spaced substantially coaxial and concentric relation relative to the cylindrically shaped electrical coil by a resilient membrane.

10. A conveyor assembly as claimed in claim 8, and wherein the reactive mass electrical transducer has a moveable magnet, and a fixed, cylindrically shaped electrical coil, and wherein the reactive mass is concentrically mounted in spaced, coaxially relation relative to the fixed cylindrically shaped electrical coil.

11. A conveyor assembly as claimed in claim 8, and further comprising a plurality of reactive mass transducers mounted on the base member.

12. A conveyor assembly as claimed in claim 8, and wherein the reciprocally moveable conveyor bed has a natural reciprocal frequency which effects an optimal movement of the product along the conveying surface, and wherein a weight of the reactive mass is selected so as to impart the natural reciprocal frequency to the reciprocally moveable conveyor bed.

13. A conveyor assembly as claimed in claim 12, and wherein the reciprocally moveable conveyor bed has a maximum reciprocal stroke, and wherein the product can move along the product conveying surface at an infinitely variable speed from a speed of 0, to the maximum reciprocal stroke attributable to the reciprocally moveable conveyor bed.

14. A conveyor assembly, comprising:
an elongated moveable conveyor bed having a product conveying surface, and which further has a center of mass, and a given weight;
a base member positioned on, and adjacent to a supporting surface, and wherein the base member supports the reciprocally moveable conveyor bed in a predetermined spaced relationship relative to supporting surface, and wherein the base member has a given weight;
a plurality of elongated springs which resiliently couple the elongated moveable conveyor bed to the base member, and further locates the elongated moveable conveyor bed in spaced relation relative to the base member;
a reactive mass electrical transducer which, when electrically energized, generates a periodic, reciprocal physical force that imparts reciprocal motion to the elongated moveable conveyor bed so as to effect a movement of a product along the product conveying surface;
a controller electrically coupled to the reactive mass electrical transducer and which generates a predetermined digital waveform; and
a signal generator electrically coupled with each of the controller and the reactive mass electrical transducer, and wherein the signal generator receives the predetermined digital waveform and converts the predetermined digital waveform into an electrical signal which energizes the reactive mass electrical transducer so as to produce the periodic physical force which is imparted to the elongated moveable conveyor bed.

15. A conveyor assembly as claimed in claim 14, and further comprising an amperage measuring device which is electrically coupled with each of the reactive mass electrical transducer, controller, and the signal generator, and wherein the amperage measuring device provides a signal to the controller regarding the operation of the reactive mass electrical transducer.

16. A conveyor assemble as claimed in claim 15, and further comprising a power amplifier electrically coupled to both the signal generator, and the amperage measuring device.

17. A conveyor assembly as claimed in claim 16, and wherein the reactive mass electrical transducer generates the periodic physical force along a predetermined line of reference which passes through the center of mass of the elongated moveable conveyor bed, and wherein the reactive mass electrical transducer is mounted in spaced relation relative to the elongated conveyor bed, and on the base member.

18. A conveyor assembly as claimed in claim 16, and wherein the elongated moveable conveyor bed has a longitudinal axis, and wherein the resilient elongated springs are located in predetermined spaced relation along the longitudinal axis of the elongated moveable conveyor bed.

19. A conveyor assembly as claimed in claim 16, and wherein the elongated moveable conveyor bed has a longitudinal axis and opposite sides, and wherein the resilient, elongated springs are located in predetermined spaced relation along the opposite sides of the elongated moveable conveyor bed.

20. A conveyor bed as claimed in claim 16, and wherein the elongated moveable conveyor bed has a longitudinal axis, and wherein the reactive mass electrical transducer, when energized, generates the periodic physical force along a line of reference which is substantially coaxially aligned with the longitudinal line of reference of the elongated moveable conveyor bed.

21. A conveyor assembly as claimed in claim 16, and wherein the elongated moveable conveyor bed has a longitudinal axis, and wherein the reactive mass electrical transducer is mounted on the elongated moveable conveyor bed, and which further, and when energized, generates the periodic physical force along a line of reference which is substantially parallel to the longitudinal axis of the elongated moveable conveyor bed.

22. A conveyor assembly as claimed in claim 16, and wherein the ratio of the weight of the elongated moveable conveyor bed to the weight of the base is about 1.8 to about 3.0.

23. A conveyor assembly as claimed in claim 16, and wherein the reactive mass has a weight of less than about 10 pounds.

24. A conveyor assembly as claimed in claim 16, and wherein the reactive mass electrical transducer, when energized, reciprocates the reactive mass at a frequency of about 12.5 Hz. to about 13.8 Hz.

25. A conveyor assembly as claimed in claim 16, and wherein the reciprocally moveable conveyor bed has a natural reciprocal frequency which effects an optimal movement of the product along the conveying surface, and wherein a weight of the reactive mass is selected so as to impart the natural reciprocal frequency to the reciprocally moveable conveyor bed.

26. A conveyor assembly as claimed in claim 16, and wherein the reciprocally moveable conveyor bed has a maximum reciprocal stroke, and wherein the product can move along the product conveying surface at an infinitely variable speed from a speed of 0, to the maximum reciprocal stroke attributable to the reciprocally moveable conveyor bed.

\* \* \* \* \*